(12) United States Patent
Neumann

(10) Patent No.: US 10,776,250 B2
(45) Date of Patent: Sep. 15, 2020

(54) SWITCHABLE ENVIRONMENTS FOR TEST CASES

(71) Applicant: salesforce.com, inc., San Francisco, CA (US)

(72) Inventor: Georg Neumann, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 358 days.

(21) Appl. No.: 15/948,684

(22) Filed: Apr. 9, 2018

(65) Prior Publication Data

US 2018/0300223 A1 Oct. 18, 2018

Related U.S. Application Data

(60) Provisional application No. 62/484,785, filed on Apr. 12, 2017.

(51) Int. Cl.
*G06F 11/36* (2006.01)

(52) U.S. Cl.
CPC ...... *G06F 11/3664* (2013.01); *G06F 11/3684* (2013.01); *G06F 11/3688* (2013.01)

(58) Field of Classification Search
CPC ............. G06F 11/3664; G06F 11/3684; G06F 11/3688
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

U.S. Appl. No. 13/986,251, filed Apr. 16, 2013.

*Primary Examiner* — Viva Miller
(74) *Attorney, Agent, or Firm* — Dergosits & Noah LLP; Todd A. Noah

(57) ABSTRACT

A service provider system receives an initial file set (specifying a customer input, an initial test case, and a customer output) created by a service provider system customer to test an application. The service provider system enables creation of a provider input based on the customer input, and creation of a provider output based on the customer output. The service provider system receives a revised file set (specifying the customer input, a revised test case, and the customer output) created by the customer to test the application. If the revised test case's switch is in a provider environment mode, the service provider system tests the application by executing the revised test case in a provider environment that is specific to the service provider system, by using the provider input to input data for the revised test case and using the provider output to output data from the revised test case.

20 Claims, 4 Drawing Sheets

(56) References Cited

U.S. PATENT DOCUMENTS

| | | | |
|---|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,609,216 B1 * | 8/2003 | Almy .................. G06F 11/3419 |
| | | | 714/25 |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,311,223 B2 * | 4/2016 | Bartley .............. G06F 11/3676 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0153830 A1 * | 8/2004 | Cebula ............... G06F 11/3688 |
| | | | 714/38.14 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0126902 A1 * | 5/2008 | Hickman ........ G01R 31/318357 |
| | | | 714/741 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0347279 A1 * | 12/2015 | Sethu ................ G06F 11/3684 |
| | | | 714/38.1 |
| 2016/0004626 A1 * | 1/2016 | Jain ..................... G06F 11/008 |
| | | | 717/130 |
| 2017/0083430 A1 * | 3/2017 | Meerovich ............. G06F 8/00 |
| 2018/0260313 A1 * | 9/2018 | Singi .................. G06F 11/3636 |
| 2020/0110695 A1 * | 4/2020 | Maciel ............... G06F 11/3684 |

* cited by examiner

SWITCHABLE ENVIRONMENTS FOR TEST CASES

CLAIM OF PRIORITY

This application claims priority under 35 U.S.C. § 119 or the Paris Convention from U.S. Provisional Patent Application 62/484,785, filed Apr. 12, 2017, the entire contents of which is incorporated herein by reference as if set forth in full herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Test automation is the use of software to configure test preconditions, controls, and reporting functions, to control the execution of tests, and to compare actual test results to predicted test results. In contrast to a single tool that performs a specific testing task, a test automation framework is a set of tools that provide automated software testing in a unified manner, thereby providing a common platform for test engineers. A test engineer can use a test automation framework to integrate function libraries, data sources, object details, and various reusable modules in a set of test files. A test automation framework enables a test engineer to define the format in which to express expectations, to create a mechanism that drives the application software which is being tested, to execute tests of the application software, and to report the results of the tests. A test engineer can use a test automation framework to create a test file set that specifies a test case for the application software to be tested, specify the test data to be input to the test case, and specify how and where to output the test results from the test case. If the test engineer revises the test case for the application software that is being tested, the test engineer may need to modify only the test file set's test case if the test files specifying how and where to output the test results from the test case and specifying the test data to be input to the test case remain unmodified.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
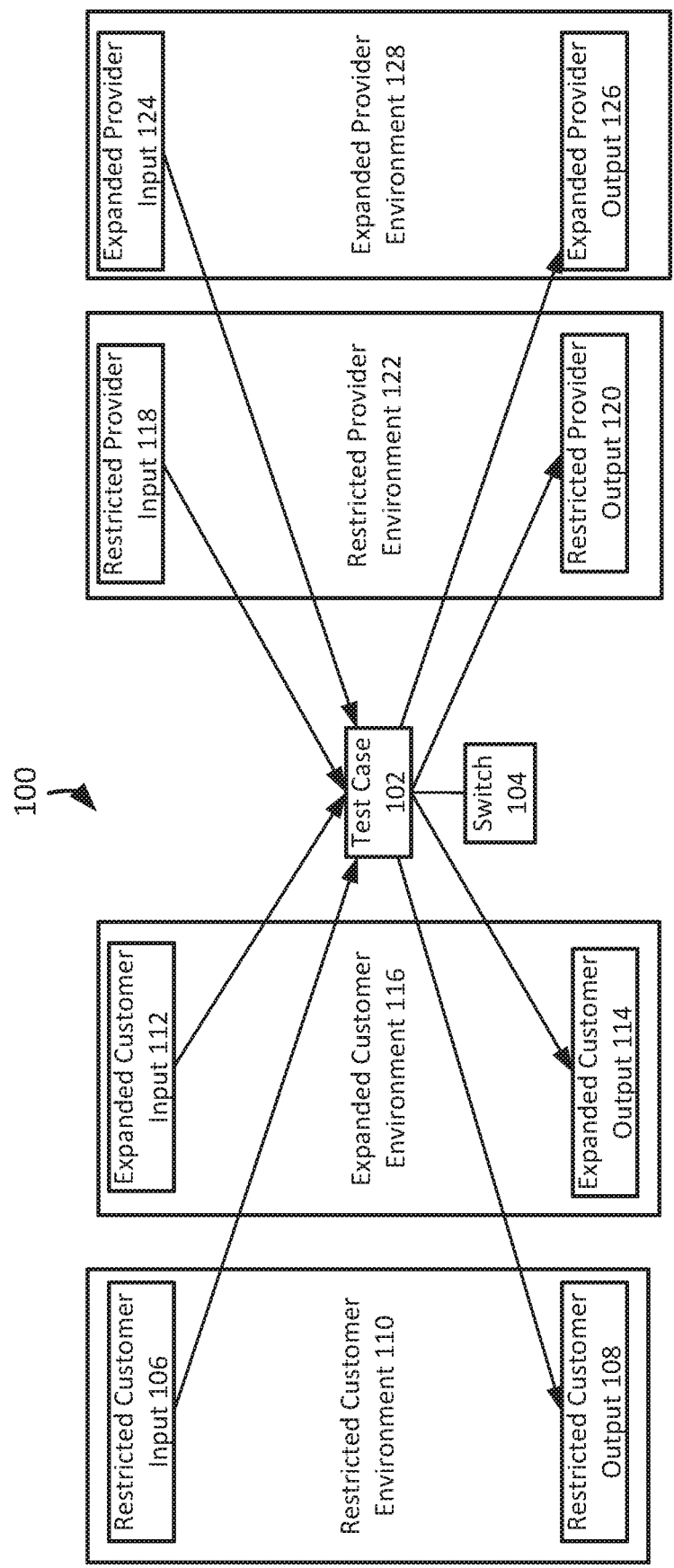
FIG. 1 illustrates example switchable environments for test cases, in an embodiment.

After a test engineer uses a test file set (which specifies a test case, an input to the test case, and how and where to output test results from the test case) to test an application in the test engineer's environment, the test engineer can send the test file set to a service provider that can use the test file set to test the application in the service provider's environment. For example, an Acme Corporation test engineer uses a test file set to test a new Acme website application using Acme's servers, and then WebService, a website service provider, uses the test file set to test the new Acme website in WebService's environment, which normally enables third-party users to access the previous Acme website application. However, the service provider has to spend a significant amount of time and effort modifying the files that specify the input to the test case from the test engineer's environment to accommodate the differences in the input to the test case from the service provider's environment. Similarly, the service provider has to spend a significant amount of time and effort modifying the files that specify how and where to output test results from the test case in the test engineer's environment to accommodate the differences in how and where to output test results from the test case in the service provider's environment. Therefore, every time that a test engineer revises the test case in the test file set for testing an application, and then sends the test file set to the service provider, the service provider has to spend a significant amount of time and effort modifying the test file set to accommodate the differences between the environments of the test engineer and the service provider. Consequently, the time and effort required for the service provider's modifications of every test file set received from each customer of the service provider negatively impacts how often and how quickly the service provider can test customers' applications in the service provider's environment.

In accordance with embodiments described herein, there are provided methods and systems for switchable environments for test cases. A service provider system receives an initial file set (which specifies an initial test case, a customer input to the initial test case, and a customer output from the initial test case) created by a service provider customer to test an application. The service provider system enables the creation of a provider input based on the customer input, and the creation of a provider output based on the customer output. The service provider system receives a revised file set (which specifies a revised test case, the same customer input, and the same customer output) created by the same customer to test the same application. If the revised test case's switch is in a provider environment mode, then the service provider system tests the application by executing the revised test case in a provider environment that is specific to the service provider system, by using the previously created provider input to input data for the revised test case and by using the previously created provider output to output data from the revised test case.

For example, WebService's service provider system receives a test file set that was created by a customer, Acme Corporation, to test new website application software for purchasing Acme's products and services. The Acme test file set specifies an Acme test case that tests the Acme website, an Acme input that includes Acme test data for the Acme test case, and an Acme output that specifies where and how to report test results from the Acme test case. A WebService test automation framework enables one of its quality engineers to modify the Acme input to create a WebService input that supplies WebService test input data for the Acme test case, and to modify the Acme output to create a WebService output by changing the Acme code for where and how to report test results from the Acme test case. The WebService test automation framework can execute the Acme test case in the WebService environment by using the newly created WebService input to input data to the Acme test case and by using the newly created WebService output to output data from the Acme test case. The WebService service provider system can send these test results to an Acme system, and then an Acme test engineer can revise the Acme test case based on these test results. Next, the WebService service provider system receives a copy of the revised Acme test file set, including a revised Acme test case, which was revised by the Acme test engineer to test the new Acme website. If the switch for the WebService copy of the revised Acme test case is in a provider environment mode, then the WebService test automation framework executes the revised Acme test case in the WebService environment by using the previously created WebService input to input data to the revised Acme test case and using the previously created WebService output to output data from the revised Acme test case. Since the service provider does not have to make any additional modifications every time that a revised test file set is provided by a customer, the service provider needs less time than before to test customers' applications in the service provider's environment. Therefore, the service provider can test applications more quickly, and test more applications, and thereby be more efficient in testing customers' applications.

Systems and methods are provided for switchable environments for test cases. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, systems and methods for switchable environments for test cases will be described with reference to example embodiments. The following detailed description will describe a system and then a method for switchable environments for test cases.

While one or more implementations and techniques are described with reference to an embodiment in which switchable environments for test cases is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts example switchable environments 100 for test cases. A customer of a service provider creates a file set (which specifies a test case, a customer input to the test case, and a customer output from the test case) to test an application. For example, one of Acme Corporation's test engineers uses an Acme test automation framework to create an Acme test file set that specifies an Acme test case for testing a new Acme website application, an Acme input that specifies Acme test data that is input for the Acme test case, and an Acme output that specifies how and where to output the test results from the Acme test case. The customer input can specify test data and environment settings to configure the customer environment for the customer test case. The test data and/or the environment settings may be specified in various sources, such as an Excel file, a database, system properties, a web driver (such as the open-source test tool Selenium WebDriver), and/or a browser configuration, and can be specified by continuous integration products, such as Jenkins and Hudson.

The customer test case may be read from an Excel file, and can include test classes, helper classes, and page object classes. The customer's system includes a customer test automation framework, and may be provided by a service provider. The customer test automation framework can have a test detection mechanism, such as JUnit, TestNG, or a home-grown assertion mechanism, to identify which code in the customer test file set is annotated test code to be executed as the customer test case, and which code in the customer test file set is code that supports execution of the customer test case, such as the customer input and the customer output. The customer output can specify where to save screenshots, logging/progress reporting, failure/error reporting, and results reporting and processing for files and databases, and may be specified by continuous integration products, such as Jenkins and Hudson.

The customer test file set can include a switch that a test automation framework reads to determine the specified environment for executing the customer test case to test the customer application. The switch may be implemented by a computing wrapper, such as a wrapper function, which is a subroutine in a software library or a computer program whose main purpose is to call another subroutine or a system call with little or no additional computation.

The customer can create the switch after creating the files for the customer test case, the customer input, and the customer output, which may require revising these files to clearly annotate the differences between the customer test case, the customer input, and the customer output. Alternatively, the customer can create the switch while creating the files for the customer test case, the customer input, and the customer output, which may require clearly annotating the differences between the customer test case, the customer input, and the customer output, during the creation of their files.

A customer can be a person or organization that uses a business' services. A service provider system can be a group of related hardware units and programs that offer a business' assistance to users. A file set can be a collection of programs and data stored in a computer's memory or on a storage device under identifying names. An application can be a computer program or piece of software designed and written to offer assistance to a user. A customer input can be what is put in, taken in, or operated on by a process or system, and specified by a person or organization that uses a business' services. A test case can be a procedure intended to establish the quality, performance, or reliability of application software, especially before the application software is taken into widespread use. A customer output can be the processing of a system's results, as specified by a person or organization that uses a business' services. A switch can be a program variable that is used to activate or deactivate a certain function of a program.

After a customer creates a test case to test an application, the switchable environments 100 for test cases includes a test case 102, which may be referred to as the customer test case 102, the initial customer test case 102, or the revised customer test case 102. After the customer creates a switch that determines an environment for executing a test case, the switchable environments 100 for test cases includes a switch 104 for the test case 102. For examples of switchable environments, the Acme test engineer can create a restricted environment at Acme Corporation for testing the new Acme website, such that only the Acme test engineer can use the Acme servers to access and test the new Acme website, and/or create an expanded environment at Acme Corporation for testing the new Acme website, such that many Acme test engineers can use the Acme servers to access and test the new Acme website. Therefore, the switchable environments 100 for test cases can include a restricted customer input 106 that specifies restricted Acme test data that is input for the test case 102, and a restricted customer output 108 that include restricted Acme specifications on how and where to output the results from the test case 102, with the restricted customer input 106 and the restricted customer output 108 comprising a restricted customer environment 110. The switchable environments 100 for test cases can include an expanded customer input 112 that specifies expanded Acme test data that is input for the test case 102, and an expanded customer output 114 that includes expanded Acme specifications on how and where to output the results from the test case 102, with the expanded customer input 112 and the expanded customer output 114 comprising an expanded customer environment 116. Although FIG. 1 depicts the switchable environments 100 for test cases as including one test case 102, one switch 104, and two customer environments 110 and 116, the switchable environments 100 for test cases can include any number of test cases 102, any number of switches 104, and any number of customer environments 110 and 116. Each test case 102 corresponds to one switch 104, which can determine which one of many customer environments 110 and 116 will be used to execute the test case 102 to test an application.

Continuing the example, one of WebService's quality engineers can receive a test file set from the Acme test engineer, and create a restricted environment at WebService's service provider system for testing Acme's new website, such that only the WebService quality engineer can use the WebService servers to access and test the new Acme website, and/or create an expanded environment at WebService's service provider system for testing the new Acme website, such that many WebService quality engineers can use the WebService servers to access and test the new Acme website. Therefore, the switchable environments 100 for test cases can include a restricted provider input 118 that specifies restricted WebService test data that is input for the test case 102, and a restricted provider output 120 that includes restricted WebService specifications on how and where to output the results from the test case 102, with the restricted provider input 118 and the restricted provider output 120 comprising a restricted provider environment 122. The switchable environments 100 for test cases can include an expanded provider input 124 that specifies expanded WebService test data that is input for the test case 102, and an expanded provider output 126 that includes expanded WebService specifications on how and where to output the results from the test case 102, with the expanded provider input 124 and the expanded provider output 126 comprising an expanded provider environment 128. Although FIG. 1 depicts the switchable environments 100 for test cases as including two provider environments 122 and 128, the switchable environments 100 for test cases can include any number of provider environments 122 and 128. Each test case 102 corresponds to one switch 104, which can determine which one of many provider environments 122 and 128 will be used to execute the test case 102 to test an application.

Figure 2:
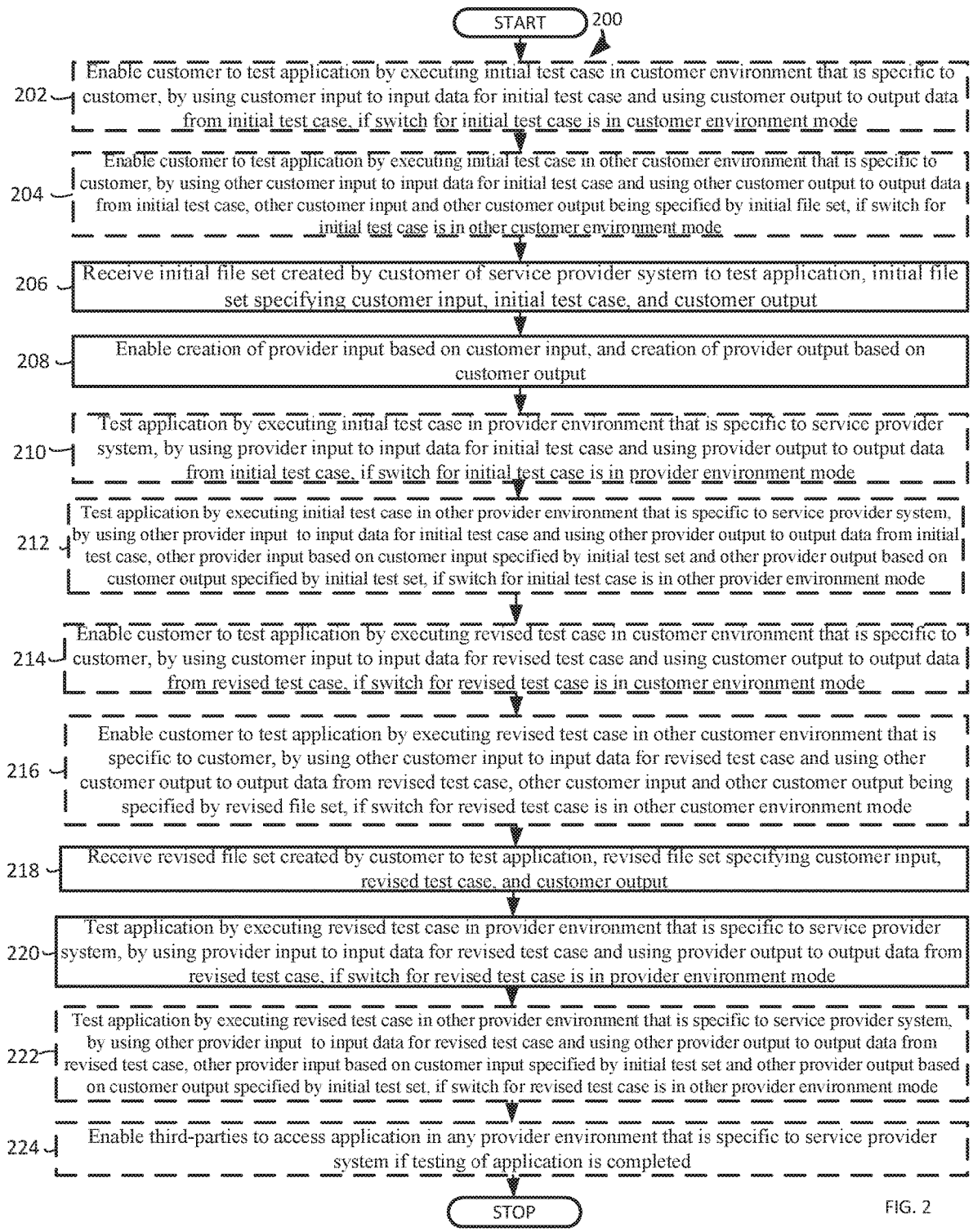
FIG. 2 is an operational flow diagram illustrating a high-level overview of a method for switchable environments for test cases, in an embodiment.

FIG. 2 is an operational flow diagram illustrating a high-level overview of a method 200 for switchable environments for test cases. After creating the initial test case 102, the switch 104, the customer input (106 and/or 112) and the customer output (108 and/or 114), the customer's test automation framework automatically checks the test case's switch to determine if a customer test engineer changes the switch from one customer environment mode to another customer environment mode, if the switch can select from many customer environment modes. If an initial test case's switch is in a customer environment mode, a customer is optionally enabled to test an application by executing the initial test case in a customer environment that is specific to the customer, by using a customer input to input data for the initial test case and using a customer output to output data from the initial test case, block 202. The service provider system enables a customer to test an application in the customer's environment. For example, and without limitation, this can include the Acme test automation framework identifying that an Acme test engineer has put the switch 104 for the initial Acme test case 102 in the restricted customer environment mode, and executing the initial Acme test case 102 in Acme's restricted customer environment 110 by using Acme's restricted customer input 106 to input data to the initial Acme test case 102, and by using Acme's restricted customer output 108 to output data from the initial Acme test case 102. The WebService service provider system can enable the Acme test automation framework to execute the Acme test case 102 in Acme's restricted customer environment 110 or Acme's expanded customer environment 116 by providing the software and the hardware for the Acme test automation framework. Alternatively, or additionally, the WebService service provider system can enable the Acme test automation framework to execute the Acme test case 102 in Acme's restricted customer environment 110 or Acme's expanded customer environment 116 by specifying the requirement to create the switch 104 for the Acme test case 102 and the requirement to clearly annotate the differences between the Acme test case 102, any customer input (106 and/or 112) to the initial Acme test case 102, and any customer output (108 and/or 114) from the initial Acme test case 102. An initial file set can be a preliminary collection of programs and data stored in a computer's memory or on a storage device under identifying names. An initial test case can be a preliminary procedure intended to establish the quality, performance, or reliability of application software, especially before the application software is taken into widespread use. A customer environment can be the overall structure within which a person, computer, or program uses services. A customer environment mode can be a way of operating the overall structure within which a person, computer, or program uses services.

If the initial test case's switch is in another customer environment mode, the customer is optionally enabled to test the application by executing the initial test case in another customer environment that is specific to the customer, by using another customer input to input data for the initial test case and using another customer output to output data from the initial test case, the other customer input and the other customer output being specified by the initial file set, block 204. The service provider system enables a customer to test an application in another one of the customer's environments. By way of example and without limitation, this can include the Acme test automation framework identifying that the Acme test engineer has put the switch 104 for the initial Acme test case 102 in the expanded customer environment mode, and executing the initial Acme test case 102 in Acme's expanded customer environment 116 by using Acme's expanded customer input 112 to input data to the initial Acme test case 102, and by using Acme's expanded customer output 114 to output data from the initial Acme test case 102.

Following creation of the initial file set by a customer of the service provider to test the application, the initial file set specifying the customer input, the initial test case, and the customer output is received by the service provider's system, block 206. The service provider system receives a test case that can test an application in a customer environment or in a service provider environment. In embodiments, this can include WebService's on-demand database service provider system receiving the Acme test file set for testing the new Acme website via a version control repository, such as a GitHub® repository. Alternatively, WebService's service provider system receives the Acme test file set via an email that includes a single compressed file, which can be decompressed to create the test file set. The test file set specifies a test case that tests the application, a customer input that includes test data for the test case, and a customer output that specifies where and how to report test results from the test case.

Having received the initial test file set specifying the customer input and the customer output, the creation is enabled of a provider input based on the customer input, and of a provider output based on the customer output, block 208. The service provider system enables the test case to test an application in the service provider's environment. For example, and without limitation, this can include the WebService service provider system providing a WebService test automation framework that enables one of its quality engineers to modify the Acme input (106 and/or 112) to create a WebService input (118 and/or 124) that supplies WebService test input data for the initial Acme test case 102, and to modify the Acme output (108 and/or 114) to create a WebService output (120 and/or 126) by changing Acme code for where and how to report test results for the initial Acme test case 102. The WebService quality engineer can modify the Acme input (106 and/or 112) to create the WebService input (118 and/or 124) by providing hard-coded test input data, configuring the web driver via system properties, providing empty files for the Acme properties that are not needed, and providing empty files for when an import statement demands the presence of an Acme file that is absent from the WebService environment (122 and/or 128). If the Acme test engineer used one test detection mechanism, such as JUnit, and WebServices uses a different test detection mechanism, such as TestNG, to identify which code in a test file set is annotated test code to be executed as the test case 102, then the Webservice quality engineer can map the Acme test file set to the WebService test file set. The WebService quality engineer can modify the Acme output (108 and/or 114) to create the WebService output (120 and/or 126) by manually changing some Acme code for sending progress reports and forwarding failure reporting, using WebService code for taking screenshots, and by providing an empty file when an import statement demands the presence of an Acme file that is absent from the WebService environment (122 and/or 128). In response to the WebService quality engineer modifying the Acme input (106 and/or 112) to create the WebService input (118 and/or 124), and modifying the Acme output (108 and/or 114) to create the WebService output (120 and/or 126), the version control repository can store the WebService input (118 and/or 124) as a revised version of the Acme input (106 and/or 112), and store the WebService output (120 and/or 126) as a revised version of the Acme output (108 and/or 114). A provider input can be what is put in, taken in, or operated on by a process or system, and is specified by a business that offers services to users. A provider output can be the processing of a system's results, as specified by a business that offers services to users.

While currently available test automation frameworks require manual modifications that consume hours each time that a service provider's system receives a revised test file set for execution in the service provider's environment, the test automation framework of the present disclosure requires such manual modifications for only the initial test file set for execution in the service provider's environment. Since the test automation framework of the present disclosure persists these manual modifications during the customer's subsequent revisions of the test case, subsequent executions of the revised test case in the service provider's environment save hours of manual modification time by simply switching the test case's switch from a customer mode to a provider mode that references the persisted manual modifications. Saving hours of manual modifications every time that a customer provides a revised copy of a test file set enables the service provider to quickly provide the customer with the results of executing the customer's test case in the service provider's environment. This saving of hours also enables the service provider to receive more test file sets from more customers during time that would have been spent on repeated manual modifications of test file sets for executing the same test case.

After creating the provider input based on the customer input and creating the provider output based on the customer output, the service provider automatically checks the test case's switch to determine if a service provider quality engineer changes the switch from a customer environment mode to a provider environment mode, and which provider environment mode if the switch can select from many provider environment modes. If the initial test case's switch is in a provider environment mode, the application is optionally tested by executing the initial test case in a provider environment that is specific to the service provider system, by using the provider input to input data for the initial test case and using the provider output to output data from the initial test case, block 210. The service provider system tests an application in the service provider's environment. By way of example and without limitation, this can include the WebService test automation framework identifying that a WebService quality engineer has put the switch 104 for the initial Acme test case 102 in the restricted provider environment mode, and executing the initial Acme test case 102 in WebService's restricted provider environment 122 by using the newly created WebService restricted customer input 118 to input data to the initial Acme test case 102, and by using the newly created WebService restricted provider output 120 to output data from the initial Acme test case 102. A provider environment can be the overall structure within which a business' computer or program offers the business' services to users. A provider environment mode can be a way of operating the overall structure within which a business' computer or program offers the business' services to users.

If the initial test case's switch is in another provider environment mode, the application is optionally tested by executing the initial test case in another provider environment that is specific to the service provider system, by using another provider input to input data for the initial test case and by using another provider output to output data from the initial test case, the other provider input based on the customer input specified by the initial test set and the other provider output based on the customer output specified by the initial test set, block 212. The service provider system tests an application in another one of the service provider's environments. In embodiments, this can include the WebService test automation framework identifying that the WebService quality engineer has put the switch 104 for the initial Acme test case 102 in the expanded provider environment mode, and executing the initial Acme test case 102 in WebService's expanded provider environment 128 by using the newly created WebService expanded provider input 124 to input data to the initial Acme test case 102, and by using the newly created WebService expanded provider output 126 to output data from the initial Acme test case 102.

The service provider system can send its test results to the customer, and then the customer can revise the customer's test case based on these test results. The customer of the service provider system can create a revised file set to test the application, the revised file set specifying the same customer input, a revised test case, and the same customer output. For example, the WebService quality engineer executes the initial Acme test case 102 to test the Acme webpage in WebService's restricted provider environment 122, receives the test results via WebService's restricted provider output 120 from the initial Acme test case 102, and sends these test results to the Acme test engineer. Based on these test results, the Acme test engineer revises the initial Acme test case 102 to create the revised Acme test case 102 to test the Acme webpage. Since the Acme test engineer revised only the initial Acme test case 102, the Acme engineer did not revise the Acme input, such as the restricted customer input 106 or the expanded customer input 112, and did not revise the Acme output, such as the restricted customer output 108 or the expanded customer output 114. Even if the Acme engineer revised the Acme input and/or the Acme output, such revisions would likely be minimal because the Acme environment is likely to change minimally between consecutive executions of the Acme test case 102. A revised file set can be a modified collection of programs and data stored in a computer's memory or on a storage device under identifying names. A revised test case can be a modified procedure intended to establish the quality, performance, or reliability of application software, especially before the application software is taken into widespread use.

After creating the revised test case 102, the customer's test automation framework automatically checks the test case's switch to determine if a customer test engineer changes the switch from one customer environment mode to another customer environment mode, if the switch can select from many customer environment modes. If the revised test case's switch is in a customer environment mode, the customer is optionally enabled to test the application by executing the revised test case in a customer environment that is specific to customer, by using the customer input to input data for the revised test case and using the customer output to output data from the revised test case, block 214. The service provider system enables a customer to retest an application in the customer's environment. For example, and without limitation, this can include the Acme test automation framework identifying that the Acme test engineer has put the switch 104 for the revised Acme test case 102 in the restricted customer environment mode, and executing the revised Acme test case 102 in Acme's restricted customer environment 110 by using Acme's restricted customer input 106 to input data to the revised Acme test case 102, and by using Acme's restricted customer output 108 to output data from the revised Acme test case 102.

If the revised test case's switch is in another customer environment mode, the customer is optionally enabled to test the application by executing the revised test case in another customer environment that is specific to the customer, by using another customer input to input data for the revised test case and using another customer output to output data from the revised test case, the other customer input and the other customer output being specified by the revised file set, block 216. The service provider system enables a customer to retest an application in another one of the customer's environments. By way of example and without limitation, this can include the Acme test automation framework identifying that the Acme test engineer has put the switch 104 for the revised Acme test case 102 in the expanded customer environment mode, and executing the revised Acme test case 102 in Acme's expanded customer environment 116 by using Acme's expanded customer input 112 to input data to the revised Acme test case 102, and by using Acme's expanded customer output 114 to output data from the revised Acme test case 102.

After the customer creates the revised file set to test the application, the revised file set specifying the same customer input, the revised test case, and the same customer output is received, block 218. The service provider system receives a revised test case that can test an application in a customer environment or a service provider environment. In embodiments, this can include the WebService service provider system receiving a copy of the revised Acme test file set, including a revised test case that was revised by the Acme test engineer to test the new Acme website, via the versioning control repository. If the revised Acme test file set includes the same Acme input (106 and/or 112) and the same Acme output (108 and/or 114) that the WebService service provider previously received, then the WebService service provider does not have to make any additional manual modifications or create a WebService input (118 and/or 124) based on the previously received Acme input (106 and/or 112) or create a WebService output (120 and/or 126) based on the previously received Acme output (108 and/or 114). Instead, the WebService quality engineer can access the versioning control repository to retrieve the previously created WebService input (118 and/or 124) based on the previously received Acme input (106 and/or 112) and retrieve the previously created WebService output (120 and/or 126) based on the previously received Acme output (108 and/or 114). Even if the Acme engineer revised the Acme input (106 and/or 112) and/or the Acme output (108 and/or 114), such revisions are likely to be minimal because the Acme environment (110 and/or 116) is likely to change minimally between consecutive executions of the Acme test case 102. If the Acme engineer revised the Acme input (106 and/or 112) and/or the Acme output (108 and/or 114), then the WebServices quality engineer can access the versioning control repository's capabilities to identify any differences between the previous and current Acme inputs (106 and/or 112), identify any differences between the previous and current Acme outputs (108 and/or 114), and make the corresponding minimal modifications to update the WebService input (118 and/or 124) and/or the WebService output (120 and/or 126), as needed.

After receiving the revised test file set that includes the revised test case, the service provider automatically checks the test case's switch to determine if a service provider quality engineer changes the switch from a customer environment mode to a provider environment mode, and which provider environment mode if the switch can select from many provider environment modes. If the revised test case's switch is in a provider environment mode, the application is tested by executing the revised test case in a provider environment that is specific to the service provider system, by using the same provider input to input data for the revised test case and using the same provider output to output data from the revised test case, block 220. The service provider system retests an application in the service provider's environment. For example, and without limitation, this can include the WebService test automation framework identifying that the WebService quality engineer has put the switch 104 for the revised Acme test case 102 in the restricted provider environment mode, and executing the revised Acme test case 102 in WebService's restricted provider environment 122 by using the previously created WebService restricted customer input 118 to input data to the revised Acme test case 102, and by using the previously created WebService restricted provider output 120 to output data from the revised Acme test case 102. Since the service provider does not have to make any additional modifications every time that a customer provides a revised test file set to the service provider, the service provider needs less time than before to test customers' applications in the service provider's environment. Therefore, the service provider can test applications more quickly, and test more applications, and thereby be more efficient in testing customers' applications.

If the revised test case's switch is in another provider environment mode, the application is optionally tested by executing the revised test case in another provider environment that is specific to the service provider system, by using another provider input to input data for the revised test case and using another provider output to output data from the revised test case, the other provider input based on the customer input specified by the initial test set and the other provider output based on the customer output specified by the initial test set, block 222. The service provider system retests an application in another one of the service provider's environments. By way of example and without limitation, this can include the WebService test automation framework identifying that the WebService quality engineer has put the switch 104 for the revised Acme test case 102 in the expanded provider environment mode, and executing the revised Acme test case 102 in WebService's expanded provider environment 128 by using the previously created WebService expanded provider input 124 to input data to the revised Acme test case 102, and by using the previously created WebService expanded provider output 126 to output data from the revised Acme test case 102.

When testing of the application is completed, third-parties are optionally enabled to access the application in any provider environment that is specific to the service provider system, block 224. The service provider system enables third-parties to use a tested application in the service provider's environment. In embodiments, this can include the WebService service provider system enabling third-party end users to access the Acme webpage, which was thoroughly tested in the WebService service provider environment (122 and/or 128) by the revised Acme test case 102. A third-party can be a person or organization besides the two primarily involved in a situation.

The method 200 may be repeated as desired. Although this disclosure describes the blocks 202-224 executing in a particular order, the blocks 202-224 may be executed in a different order. In other implementations, each of the blocks 202-224 may also be executed in combination with other blocks and/or some blocks may be divided into a different set of blocks.

System Overview

Figure 3:
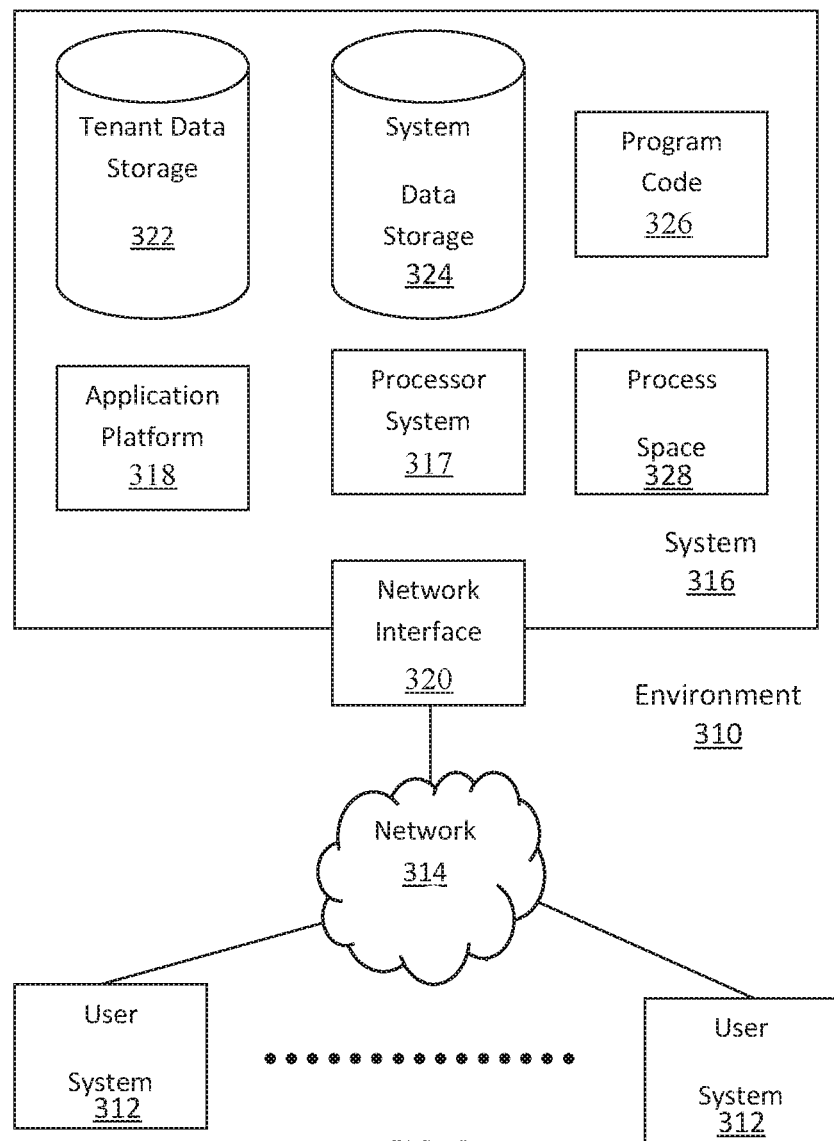
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system.

In an embodiment, the on-demand database service 316 may include the application platform 318 which enables creation, managing and executing one or more applications developed by the provider of the on-demand database service, users accessing the on-demand database service via user systems 312, or third-party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third-party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
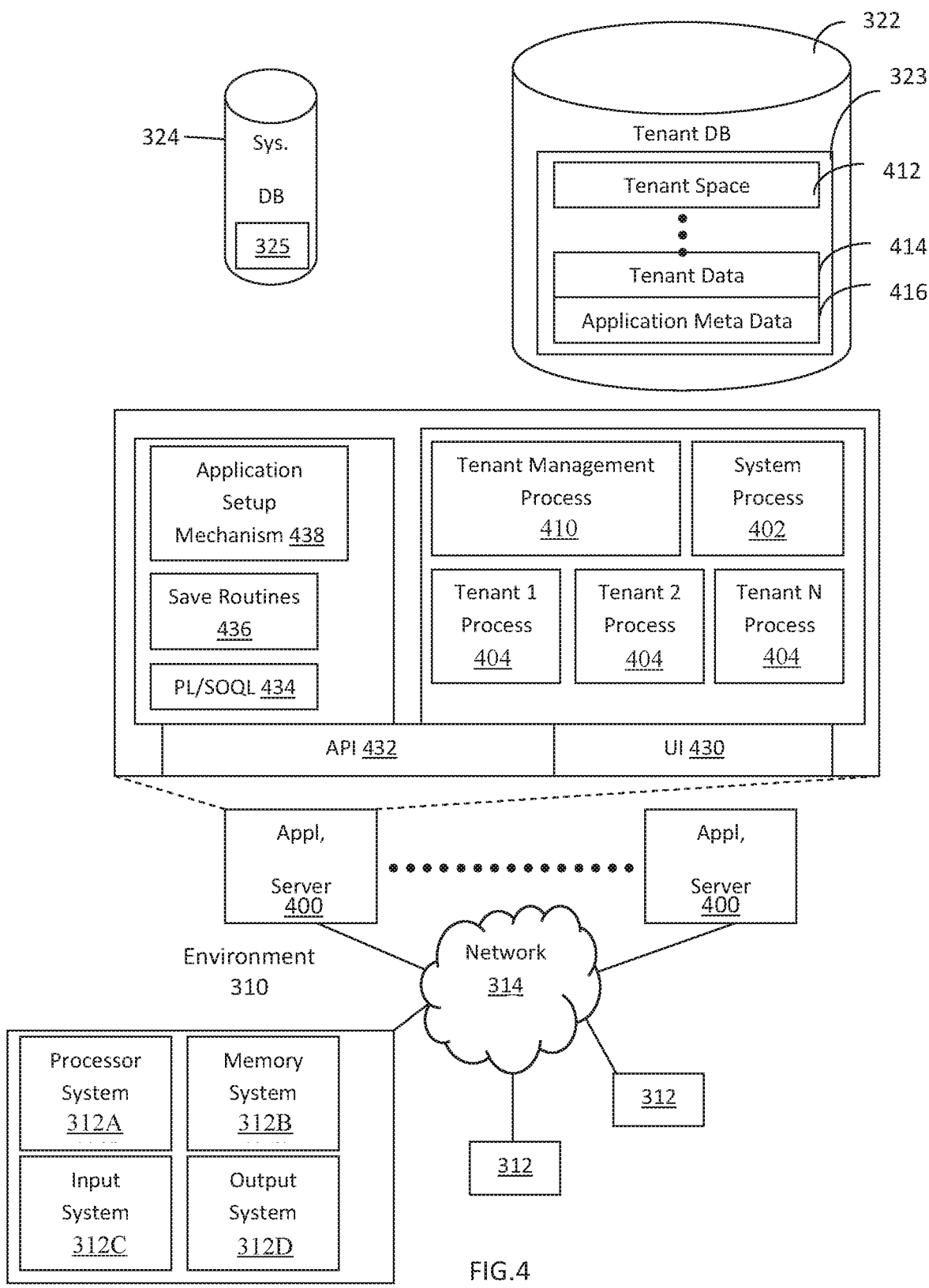
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long-term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATA- BASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
receive, by a service provider system, an initial file set created by a customer of the service provider system to test an application, the initial file set specifying a customer input, an initial test case, and a customer output;
enable, by the service provider system, creation of a provider input based on the customer input, and creation of a provider output based on the customer output;
receive, by the service provider system, a revised file set created by the customer to test the application, the revised file set specifying the customer input, a revised test case, and the customer output; and
test, by the service provider system, the application by executing the initial test case and the revised test case in a provider environment specific to the service provider system in response to a determination that switches for the initial and revised test cases are in a provider environment mode, the initial and revised test cases being executed using the provider input to input data for the initial and revised test cases and using the provider output to output data from the initial and revised test cases.

2. The system of claim 1, comprising further instructions, which when executed, cause the one or more processors to:
enable, by the service provider system, the customer to test the application by executing the initial test case in a customer environment that is specific to the customer, by using the customer input to input data for the initial test case and using the customer output to output data from the initial test case, in response to a determination that a switch for the initial test case is in a customer environment mode; and
enable, by the service provider system, the customer to test the application by executing the initial test case in another customer environment that is specific to the customer, by using another customer input to input data for the initial test case and using another customer output to output data from the initial test case, the other customer input and the other customer output being specified by the initial file set, in response to a determination that the switch for the initial test case is in another customer environment mode.

3. The system of claim 1, comprising further instructions, which when executed, cause the one or more processors to:
test, by the service provider system, the application by executing the initial test case in another provider environment that is specific to the service provider system, by using another provider input to input data for the initial test case and using another provider output to output data from the initial test case, the other provider input based on the customer input specified by the initial test set and the other provider output based on the customer output specified by the initial test set, in response to a determination that the switch for the initial test case is in another provider environment mode.

4. The system of claim 1, comprising further instructions, which when executed, cause the one or more processors to:

enable, by the service provider system, the customer to test the application by executing the revised test case in a customer environment that is specific to the customer, by using the customer input to input data for the revised test case and using the customer output to output data from the revised test case, in response to a determination that the switch for the revised test case is in a customer environment mode; and
enable, by the service provider system, the customer to test the application by executing the revised test case in another customer environment that is specific to the customer, by using another customer input to input data for the revised test case and using another customer output to output data from the revised test case, the other customer input and the other customer output being specified by the revised file set, in response to a determination that the switch for the revised test case is in another customer environment mode.

5. The system of claim 1, comprising further instructions, which when executed, cause the one or more processors to test, by the service provider system, the application by executing the revised test case in another provider environment that is specific to the service provider system, by using another provider input to input data for the revised test case and using another provider output to output data from the revised test case, the other provider input based on the customer input specified by the initial test set and the other provider output based on the customer output specified by the initial test set, in response to a determination that the switch for the revised test case is in another provider environment mode.

6. The system of claim 1, comprising further instructions, which when executed, cause the one or more processors to enable, by the service provider system, a plurality of third-parties to access the application in any provider environment that is specific to the service provider system, in response to a determination that testing of the application is completed.

7. The system of claim 1, wherein executing the revised test case in the provider environment that is specific to the service provider system comprises a test automation framework executing the revised test case.

8. A computer program product comprising computer-readable program code to be executed by one or more processors when retrieved from a non-transitory computer-readable medium, the program code including instructions to:
receive, by a service provider system, an initial file set created by a customer of the service provider system to test an application, the initial file set specifying a customer input, an initial test case, and a customer output;
enable, by the service provider system, creation of a provider input based on the customer input, and creation of a provider output based on the customer output;
receive, by the service provider system, a revised file set created by the customer to test the application, the revised file set specifying the customer input, a revised test case, and the customer output; and
test, by the service provider system, the application by executing the initial test case and the revised test case in a provider environment specific to the service provider system in response to a determination that switches for the initial and revised test cases are in a provider environment mode, the initial and revised test cases being executed using the provider input to input data for the initial and revised test cases and using the provider output to output data from the initial and revised test cases.

9. The computer program product of claim 8, wherein the program code comprises further instructions to:
    enable, by the service provider system, the customer to test the application by executing the initial test case in a customer environment that is specific to the customer, by using the customer input to input data for the initial test case and using the customer output to output data from the initial test case, in response to a determination that a switch for the initial test case is in a customer environment mode; and
    enable, by the service provider system, the customer to test the application by executing the initial test case in another customer environment that is specific to the customer, by using another customer input to input data for the initial test case and using another customer output to output data from the initial test case, the other customer input and the other customer output being specified by the initial file set, in response to a determination that the switch for the initial test case is in another customer environment mode.

10. The computer program product of claim 8, wherein the program code comprises further instructions to:
    test, by the service provider system, the application by executing the initial test case in another provider environment that is specific to the service provider system, by using another provider input to input data for the initial test case and using another provider output to output data from the initial test case, the other provider input based on the customer input specified by the initial test set and the other provider output based on the customer output specified by the initial test set, in response to a determination that the switch for the initial test case is in another provider environment mode.

11. The computer program product of claim 8, wherein the program code comprises further instructions to:
    enable, by the service provider system, the customer to test the application by executing the revised test case in a customer environment that is specific to the customer, by using the customer input to input data for the revised test case and using the customer output to output data from the revised test case, in response to a determination that the switch for the revised test case is in a customer environment mode; and
    enable, by the service provider system, the customer to test the application by executing the revised test case in another customer environment that is specific to the customer, by using another customer input to input data for the revised test case and using another customer output to output data from the revised test case, the other customer input and the other customer output being specified by the revised file set, in response to a determination that the switch for the revised test case is in another customer environment mode.

12. The computer program product of claim 8, wherein the program code comprises further instructions to test, by the service provider system, the application by executing the revised test case in another provider environment that is specific to the service provider system, by using another provider input to input data for the revised test case and using another provider output to output data from the revised test case, the other provider input based on the customer input specified by the initial test set and the other provider output based on the customer output specified by the initial test set, in response to a determination that the switch for the revised test case is in another provider environment mode.

13. The computer program product of claim 8, wherein the program code comprises further instructions to enable, by the service provider system, a plurality of third-parties to access the application in any provider environment that is specific to the service provider system, in response to a determination that testing of the application is completed.

14. The computer program product of claim 8, wherein executing the revised test case in the provider environment that is specific to the service provider system comprises a test automation framework executing the revised test case.

15. A method comprising:
    receiving, by a service provider system, an initial file set created by a customer of the service provider system to test an application, the initial file set specifying a customer input, an initial test case, and a customer output;
    enabling, by the service provider system, creation of a provider input based on the customer input, and creation of a provider output based on the customer output;
    receiving, by the service provider system, a revised file set created by the customer to test the application, the revised file set specifying the customer input, a revised test case, and the customer output; and
    testing, by the service provider system, the application by executing the initial test case and the revised test case in a provider environment specific to the service provider system in response to a determination that switches for the initial and revised test cases are in a provider environment mode, the initial and revised test cases being executed using the provider input to input data for the initial and revised test cases and using the provider output to output data from the initial and revised test cases.

16. The method of claim 15, the method further comprising:
    enabling, by the service provider system, the customer to test the application by executing the initial test case in a customer environment that is specific to the customer, by using the customer input to input data for the initial test case and using the customer output to output data from the initial test case, in response to a determination that a switch for the initial test case is in a customer environment mode; and
    enabling, by the service provider system, the customer to test the application by executing the initial test case in another customer environment that is specific to the customer, by using another customer input to input data for the initial test case and using another customer output to output data from the initial test case, the other customer input and the other customer output being specified by the initial file set, in response to a determination that the switch for the initial test case is in another customer environment mode.

17. The method of claim 15, the method further comprising:
    testing, by the service provider system, the application by executing the initial test case in another provider environment that is specific to the service provider system, by using another provider input to input data for the initial test case and using another provider output to output data from the initial test case, the other provider input based on the customer input specified by the initial test set and the other provider output based on the customer output specified by the initial test set, in response to a determination that the switch for the initial test case is in another provider environment mode.

18. The method of claim 15, the method further comprising:
enabling, by the service provider system, the customer to test the application by executing the revised test case in a customer environment that is specific to the customer, by using the customer input to input data for the revised test case and using the customer output to output data from the revised test case, in response to a determination that the switch for the revised test case is in a customer environment mode; and
enabling, by the service provider system, the customer to test the application by executing the revised test case in another customer environment that is specific to the customer, by using another customer input to input data for the revised test case and using another customer output to output data from the revised test case, the other customer input and the other customer output being specified by the revised file set, in response to a determination that the switch for the revised test case is in another customer environment mode.

19. The method of claim 15, the method further comprising testing, by the service provider system, the application by executing the revised test case in another provider environment that is specific to the service provider system, by using another provider input to input data for the revised test case and using another provider output to output data from the revised test case, the other provider input based on the customer input specified by the initial test set and the other provider output based on the customer output specified by the initial test set, in response to a determination that the switch for the revised test case is in another provider environment mode.

20. The method of claim 15, the method further comprising enabling, by the service provider system, a plurality of third-parties to access the application in any provider environment that is specific to the service provider system, in response to a determination that testing of the application is completed.

* * * * *